United States Patent
Morii et al.

(10) Patent No.: US 8,624,724 B2
(45) Date of Patent: Jan. 7, 2014

(54) POSITION INFORMATION ACQUISITION APPARATUS AND METHOD OF CONTROLLING THE SAME

(75) Inventors: Takashi Morii, Yokohama (JP); Shozo Endo, Kawasaki (JP); Shinji Kurokawa, Yokohama (JP); Keita Sonoda, Yokohama (JP); Hidenori Shiba, Tokyo (JP); Tadashi Koyama, Kawasaki (JP); Hiroshi Toriumi, Hiratsuka (JP); Masakazu Nakadokoro, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 311 days.

(21) Appl. No.: 13/219,986

(22) Filed: Aug. 29, 2011

(65) Prior Publication Data

US 2012/0050035 A1    Mar. 1, 2012

(30) Foreign Application Priority Data

Sep. 1, 2010  (JP) .................... 2010-195825

(51) Int. Cl.
*G08B 1/08* (2006.01)
*H04N 5/232* (2006.01)

(52) U.S. Cl.
USPC ............ 340/539.13; 340/539.1; 382/100; 348/207.99; 348/211.1; 348/211.99

(58) Field of Classification Search
USPC .................... 340/539.13; 348/211.1
See application file for complete search history.

(56) References Cited

U.S. PATENT DOCUMENTS

| | | | | |
|---|---|---|---|---|
| 7,746,388 B2 * | 6/2010 | Jeon | ............... | 348/231.2 |
| 2001/0055373 A1 * | 12/2001 | Yamashita | .............. | 379/90.01 |
| 2004/0228460 A1 * | 11/2004 | Keramane | .............. | 379/110.01 |
| 2006/0187317 A1 * | 8/2006 | Montulli et al. | ........... | 348/231.5 |
| 2010/0250727 A1 | 9/2010 | King | | |

FOREIGN PATENT DOCUMENTS

| | | |
|---|---|---|
| JP | 7064169 A | 3/1995 |
| JP | 2004159048 A | 6/2004 |
| WO | 2008136859 A1 | 11/2008 |

* cited by examiner

*Primary Examiner* — Donnie Crosland
(74) *Attorney, Agent, or Firm* — Canon USA, Inc., IP Division

(57) ABSTRACT

A position information acquisition apparatus capable of wireless communication with an imaging apparatus, the position information acquisition apparatus includes position information acquisition apparatus configured to acquire position information that indicates a position of the position information acquisition apparatus, reception apparatus configured to receive a request for the position information from the imaging apparatus; position information transmission apparatus configured to transmit by the wireless communication the position information acquired by the position information acquisition apparatus in response to a request for position information from the imaging apparatus, determination apparatus (209) configured to determine whether the position information acquisition apparatus transmit the position information, and signal transmission apparatus configured to transmit a signal to the imaging apparatus by the wireless communication if the determination apparatus determines that position information acquisition apparatus does not transmit the position information, the signal inhibiting a request for the position information.

14 Claims, 5 Drawing Sheets

POSITION INFORMATION ACQUISITION APPARATUS AND METHOD OF CONTROLLING THE SAME

BACKGROUND OF THE INVENTION

1. Field of the Invention

The present invention relates to a position information acquisition apparatus which transmits position information to an imaging apparatus in order to add position information to image data, and a method of controlling the same.

2. Description of the Related Art

A digital camera has recently been known that can add position information at the time of photographing to acquired image data using a position information acquisition unit such as a global positioning system (GPS) as discussed in Japanese Patent Application Laid-Open No. 7-64169. Furthermore, Japanese Patent Application Laid-Open No. 2004-159048 discusses a configuration in which a position information acquisition unit and a digital camera are separated from each other. Yet further, the position information acquisition unit and the digital camera in the cited documents transmit and receive position information by wireless communication.

According to the foregoing technology, the digital camera and the position information acquisition unit need to perform wireless communications even in situations where the position information acquisition unit is not able to acquire position information. The reason is that the digital camera needs to check by the wireless communication whether the position information acquisition unit has successfully acquired position data. This gives rise to a problem that such wireless communication consume power uselessly when it is not needed to acquire position information from the position information acquisition unit.

SUMMARY OF THE INVENTION

The present invention is directed to reducing useless power consumption related to communications between an imaging apparatus and a position information acquisition apparatus.

According to an aspect of the present invention, a position information acquisition apparatus capable of wireless communication with an imaging apparatus, the position information acquisition apparatus includes a position information acquisition unit configured to acquire position information that indicates a position of the position information acquisition apparatus, a reception unit configured to receive a request for the position information from the imaging apparatus; a position information transmission unit configured to transmit by the wireless communication the position information acquired by the position information acquisition unit in response to a request for position information from the imaging apparatus, a determination unit configured to determine whether position information can be acquired by the position information acquisition unit; and a signal transmission unit configured to transmit a signal to the imaging apparatus by the wireless communication if the determination unit determines that position information cannot be acquired, the signal inhibiting a request for the position information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

A first exemplary embodiment will be described.

Figure 1:
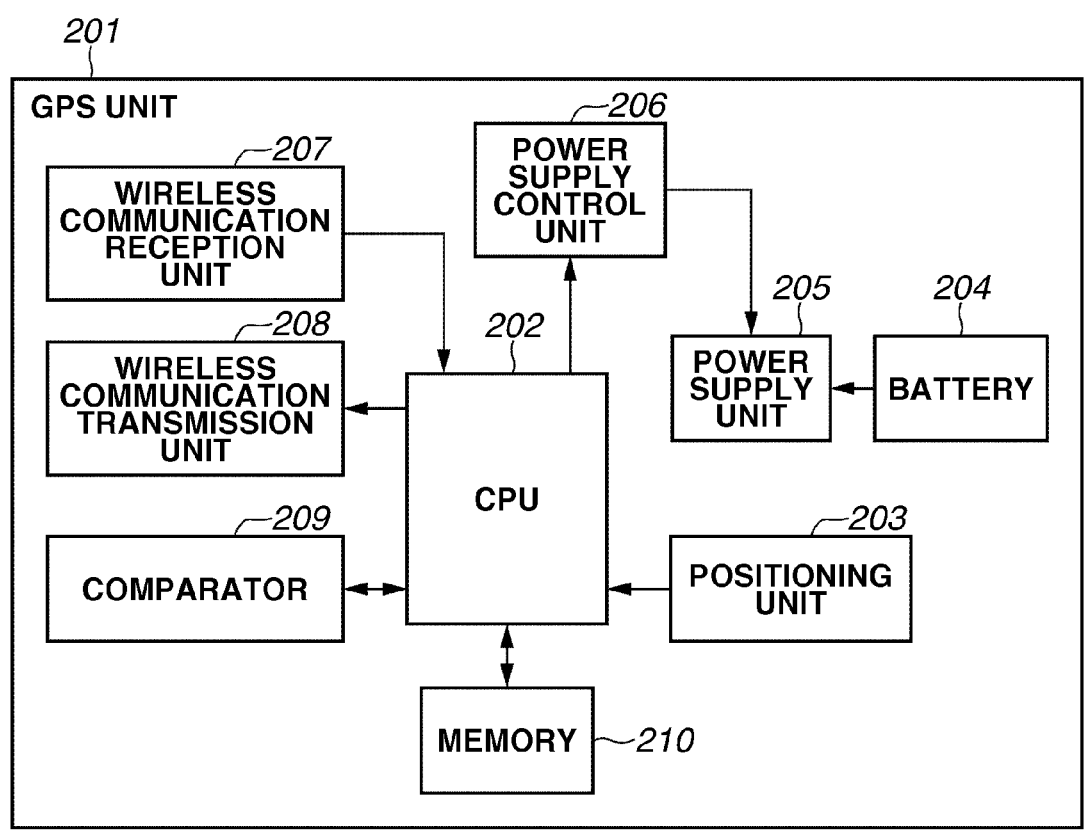
FIG. 1 is a block diagram illustrating a schematic configuration of a GPS unit according to a first exemplary embodiment.
Figure 2:
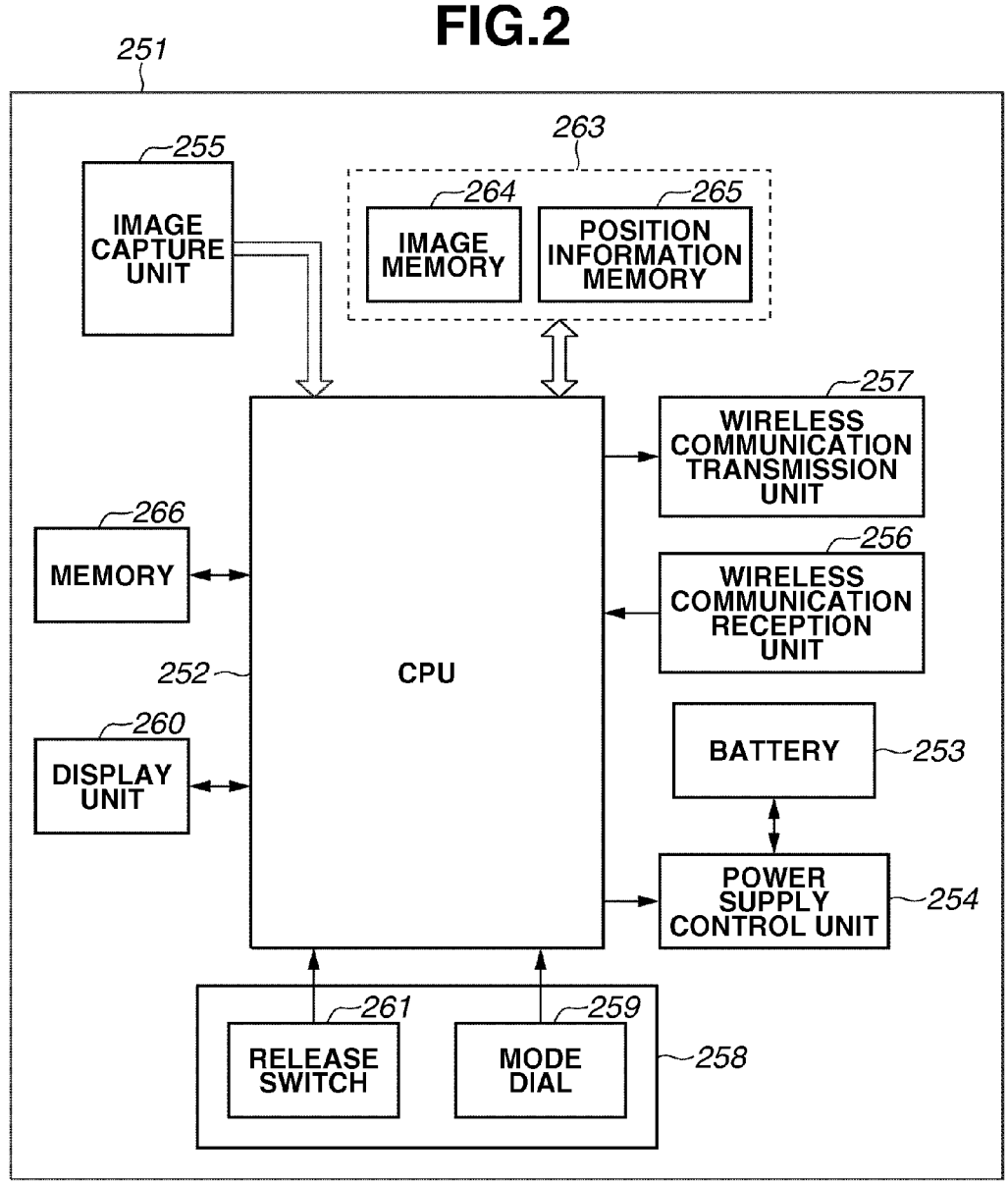
FIG. 2 is a block diagram illustrating a schematic configuration of a camera unit according to the first exemplary embodiment.

FIG. 1 is a block diagram illustrating a GPS unit 201 which is an example of a position information acquisition apparatus according to the present exemplary embodiment. FIG. 2 is a block diagram illustrating a schematic configuration of a camera unit 251 which is an example of an imaging apparatus according to the present exemplary embodiment. In the present exemplary embodiment, the GPS unit 201 and the camera unit 251 are configured as separate units. The GPS unit 201 and the camera unit 251 can communicate by wireless communications, transmitting information to each other. Alternatively, of course, the communication may be by wire and the GPS unit and the camera unit may be connected or even integral units that communicate with each other.

Referring to FIG. 1, the GPS unit 201 will be described. A central processing unit (CPU) 202 controls the entire GPS unit 201 according to input signals from various components and programs. Specifically, the CPU 202 controls recording, communications, and power. In addition to the CPU 202, a power supply control unit 206 is used for power control. The power supply control unit 206 controls a power supply unit 205 based on information from the CPU 202. The power supply unit 205 supplies power from a battery 204 to the GPS unit 201.

The battery 204 may be detachably attached to the GPS unit 201 like a dry cell battery. The GPS unit 201 may have the battery 204 built-in. A positioning unit 203 is a GPS-capable device. The positioning unit 203 includes an antenna. Based on information received from satellites, the positioning unit 203 acquires position information that indicates the current position of the GPS unit 201. The positioning unit 203 may acquire position information regularly and/or at certain timing under the control of the CPU 202. While in the present exemplary embodiment the positioning unit 203 acquires position information by GPS, the acquisition method is not necessarily limited thereto. For example, the positioning unit 203 may acquire the current position of the GPS unit 201 based on information on wireless access points, the internet, and/or cellular phone base stations.

A wireless communication reception unit 207 communicates with the camera unit 251 wirelessly. The wireless communication reception unit 207 receives various data including a position information acquisition request. A wireless communication transmission unit 208 communicates with the camera unit 251 wirelessly. The wireless communication transmission unit 208 transmits various data including position information, an addition inhibition signal, a request inhibition signal, and a request permission signal as will be discussed later. The wireless communication system of the wireless communication reception unit 207 and the wireless communication transmission unit 208 may employ infrared communication, Bluetooth, wireless local area network (LAN), and other wireless communication systems.

The wireless communication reception unit 207 and the wireless communication transmission unit 208 may be composed of a single piece of hardware, and may be composed of a plurality of pieces of hardware. A comparator 209 detects a change in position information acquired in succession. The comparator 209 may be implemented by a piece of hardware other than the CPU 202. The CPU 202 may function as the comparator 209. A memory 210 records various data including position information acquired by the positioning unit 203.

Referring to FIG. 2, the camera unit 251 will be described. A CPU 252 controls the entire camera unit 251 according to input signals from various components and programs. A power supply 253 and a power supply control unit 254 have the same roles as those of the power supply unit 205 and the power supply control unit 206 of the GPS unit 201 of FIG. 1. An image capture unit 255 captures an image of a subject to acquire image data. A wireless communication reception unit 256 communicates with the GPS unit 201 wirelessly. The wireless communication reception unit 256 receives various data including position information, an addition inhibition signal, a request inhibition signal, and a request permission signal, all of which will be described later. A wireless communication transmission unit 257 communicates with the GPS unit 201 wirelessly. The wireless communication transmission unit 257 transmits various data including a position information acquisition request. The wireless communication system of the wireless communication reception unit 256 and the wireless communication transmission unit 257 may employ infrared communication, Bluetooth, wireless LAN, and other wireless communication systems.

The wireless communication reception unit 256 and the wireless communication transmission unit 257 may be composed of a single piece of hardware, or may be composed of a plurality of pieces of hardware. An operation unit 258 includes a mode dial 259 and a release switch 261. The mode dial 259 is used to select modes such as still image recording, moving image recording, and playback. The release switch 261 is used to instruct the image capture unit 255 to make an image capture operation (i.e. it may be a "shutter release button". The operation unit 258 may include other operation members.

A display unit 260 displays images obtained by the image capture unit 255, as well as various notifications and operation menus. A memory 266 is a volatile memory. The memory 266 is used to store various data temporarily. A recording medium 263 is a nonvolatile memory. The recording medium 263 may be a removable storage medium such as a memory card, and the camera unit 251 may have a flash memory built-in. The recording medium 263 includes an image memory 264 which is intended for image data, and a position information memory 265 which is intended for position information. The two memories 264 and 265 need not be physically divided, and have only to be managed so that the CPU 252 can distinguish image data from position information.

Figure 3:
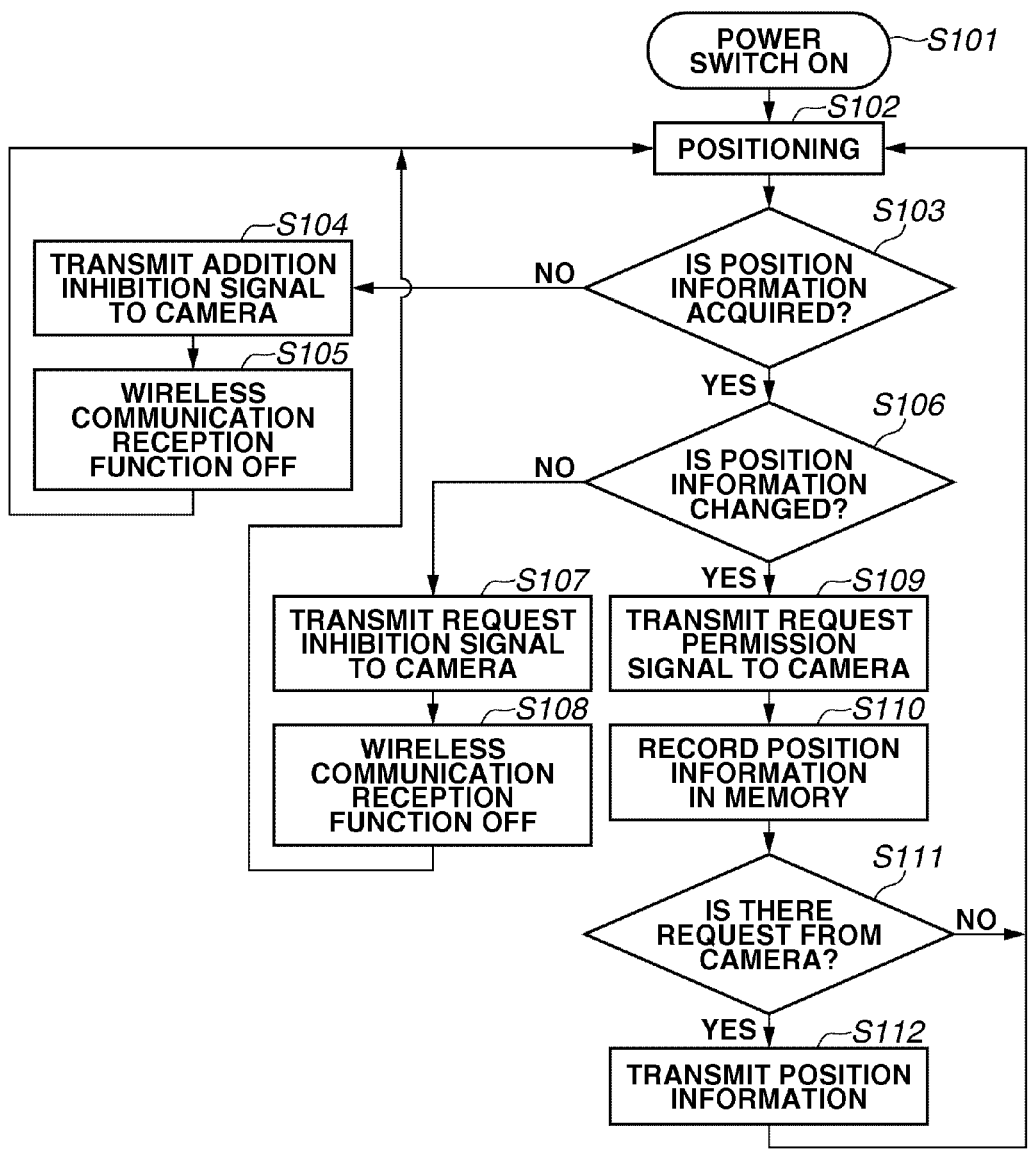
FIG. 3 is a flowchart illustrating a processing operation of the GPS unit according to the first exemplary embodiment.
Figure 4:
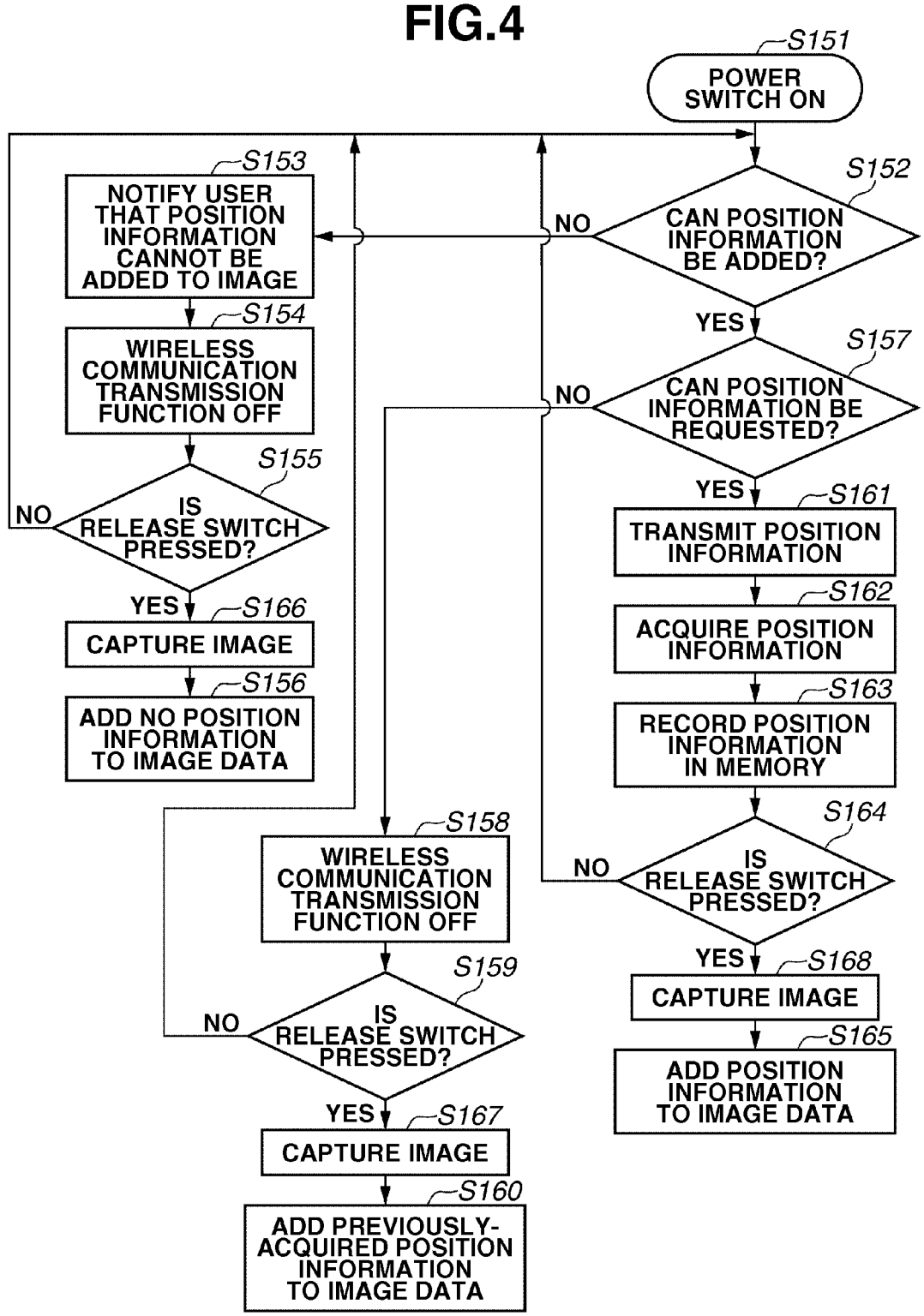
FIG. 4 is a flowchart illustrating a processing operation of the camera unit according to the first exemplary embodiment.

Referring to FIGS. 3 and 4, processing operations of the GPS unit 201 and the camera unit 251 according to the present exemplary embodiment will be described below. Initially, the operation of the GPS unit 201 will be described with reference to FIG. 3. The operation illustrated in FIG. 3 is implemented by the CPU 202 of the GPS unit 201 controlling various components according to a program.

In step S101, a user initially turns the power ON. In step S102, the CPU 202 starts positioning using the positioning unit 203.

In step S103, the CPU 202 determines whether position information is successfully acquired by the positioning unit 203. If position information is determined not to be acquired (No in step S103), then the CPU 202 proceeds to step S104. In step S104, the CPU 202 transmits an addition inhibition signal from the wireless communication transmission unit 208 to the camera unit 251. The addition inhibition signal is a control signal for requesting the camera unit 251 not to add position information, e.g. to the position information memory 265. As will be described later, the camera unit 251 receiving the addition inhibition signal suspends its own wireless communication transmission function.

In step S105, the CPU 202 turns OFF the wireless communication reception function of the wireless communication reception unit 207. Specifically, the CPU 202 turns OFF or reduces the power supply to the wireless communication reception unit 207 through the power supply control unit 206. This can reduce the power consumption of the wireless communication reception unit 207.

Next, description will be given for the case where position information is determined to be acquired (Yes in step S103). In such a case, the CPU 202 proceeds to step S106. In step S106, the CPU 202 of the GPS unit 201 determines whether there is a change in the position information. Specifically, the CPU 202 compares previously-acquired position information recorded in the memory 210 with the currently-acquired position information by the comparator 209. The CPU 202 then determines whether the currently-acquired position information is changed by more than a predetermined value with respect to the previously-acquired position information. If the position information is determined not to be changed by more than the predetermined value (No in step S106), the CPU 202 proceeds to step S107. If the position information is determined to be changed by more than the predetermined value (Yes in step S106), the CPU 202 proceeds to step S109.

In step S107, the CPU 202 transmits a request inhibition signal from the wireless communication transmission unit 208 to the camera unit 251. The request inhibition signal is a control signal for requesting the camera unit 251 not to request position information from the GPS unit 201. As will be described later, the camera unit 251 receiving the request inhibition signal suspends its own wireless communication transmission function. In step S108, the CPU 202 then turns OFF the wireless communication reception function of the wireless communication reception unit 207. This can reduce the power consumption of the wireless communication reception unit 207.

If the position information is determined to be changed by more than the predetermined value (Yes in step S106), then in step S109, the CPU 202 transmits a request permission signal from the wireless communication transmission unit 208 to the camera unit 251. The request permission signal is a control signal for permitting the camera unit 251 to request position information from the GPS unit 201. The inhibition on the request of position information imposed by the request inhibition signal is released by the request permission signal.

In step S110, the CPU 202 then records the position information acquired in step S102 into the memory 210. The memory 210 is overwritten with the position information that is the last acquired, i.e., the latest position information. In step S111, the CPU 202 then determines whether a position information acquisition request is received from the camera unit

251. If the position information acquisition request is determined not to be received from the camera unit 251 (No in step S111), the processing returns to step S102. If a position information acquisition request is determined to be received from the camera unit 251 (Yes in step S111), the processing proceeds to step S112. In step S112, the CPU 202 transmits the position information recorded in the memory 210 to the camera unit 251. In such a way, the GPS unit 201 transmits position information in response to a request from the camera unit 251. After the operation of step S111 or S112, the processing returns to step S102 and the GPS unit 201 starts acquiring new position information.

Next, the operation of the camera unit 251 will be described with reference to FIG. 4. The operation illustrated in FIG. 4 is implemented by the CPU 252 of the camera unit 251 controlling various components according to a program. The camera unit 251 can receive the addition inhibition signal, request inhibition signal, and request permission signal in parallel with the procedure even in the middle of the flow.

In step S151, the user turns the power ON. In step S152, the CPU 252 checks for the reception of a signal from the GPS unit 201, and determines whether position information can be added to image data. If the addition inhibition signal is or has been received from the GPS unit 201 (No in step S152), then the CPU 252 determines that position information cannot be added, and the processing proceeds to step S153. If the addition inhibition signal is not or has not been received from the GPS unit 201 (Yes in step S152), then the CPU 252 determines that position information can be added, and the processing proceeds to step S157.

In step S153, the CPU 252 displays a message on the display unit 260 to notify the user that position information cannot be added to images. In step S154, the CPU 252 then turns OFF the wireless communication transmission function of the wireless communication transmission unit 257. Specifically, the CPU 252 turns OFF or reduces the power supply to the wireless communication transmission unit 257 through the power supply control unit 254. This inhibits the digital camera 100 from transmitting a position information acquisition request to the GPS unit 201, whereby the power consumption of the wireless communication transmission unit 257 can be reduced.

In step S155, the CPU 252 then determines whether the release switch 261 is pressed. If the release switch 261 is determined not to be pressed (No in step S155), the CPU 252 returns to step S152. If the release switch 261 is determined to be pressed (Yes in step S155), the CPU 252 proceeds to step S166. In step S166, the CPU 252 captures an image of a subject and acquires image data by the image capture unit 255. In step S156, the CPU 252 stores the image data into the image memory 264 without adding position information. The reason is due to the reception of the addition inhibition signal from the GPS unit 201.

If it is determined that position information is determined to be able to be added (Yes in step S152), i.e., if the addition inhibition signal is not received from the GPS unit 201, the CPU 252 proceeds to step S157. In step S157, the CPU 252 determines whether position information can be requested. If the request inhibition signal is received from the GPS unit 201 (No in step S157), the CPU 252 determines that position information cannot be requested, and the processing proceeds to step S158. If the request inhibition signal is not received from the GPS unit 201 (Yes in step S157), the CPU 252 determines that position information can be requested, and the processing proceeds to step S161.

In step S158, the CPU 252 turns OFF the wireless communication transmission function of the wireless communication transmission unit 257. This inhibits the digital camera 100 from transmitting a position information acquisition request to the GPS unit 201, whereby the power consumption of the wireless communication transmission unit 257 can be reduced. In step S159, the CPU 252 then determines whether the release switch 261 is pressed. If the release switch 261 is determined not to be pressed (No in step S159), the processing returns to step S152. If the release switch 261 is determined to be pressed (Yes in step S159), the CPU 252 proceeds to step S167. In step S167, the CPU 252 captures an image of a subject and acquires image data by using the image capture unit 255. In step S160, the CPU 252 adds previously-acquired position information stored in the position information memory 265 to the acquired image data, and stores the resulting image data into the image memory 264.

In step S161, the CPU 252 supplies power to the wireless communication transmission unit 257 through the power supply control unit 254. The CPU 252 then transmits a position information acquisition request from the wireless communication transmission unit 257 to the GPS unit 201. In step S162, the CPU 252 acquires position information from the GPS unit 201 through the wireless communication reception unit 256. In step S163, the CPU 252 records the acquired position information into the position information memory 265.

In step S164, the CPU 252 then determines whether the release switch 261 is pressed. If the release switch 261 is determined not to be pressed (No in step S164), the processing returns to step S152. If the release switch 261 is determined to be pressed (Yes in step S164), the processing proceeds to step S168. In step S168, the CPU 252 captures an image of a subject and acquires image data by the image capture unit 255. In step S165, the CPU 252 then adds the position information recorded in the position information memory 265 in step S163 to the image data, and stores the resulting image data into the image memory 264.

As has been described above, in the present exemplary embodiment, the GPS unit 201 determines how the camera unit 251 should operate, and transmits control signals. If the GPS unit 201 determines that position information cannot be acquired, the GPS unit 201 transmits the addition inhibition signal to the camera unit 251, and turns OFF the reception function of the GPS unit 201 and the transmission function of the camera unit 251. If the GPS unit 201 determines that position information is not changed, the GPS unit 201 transmits the request inhibition signal to the camera unit 251, and turns OFF the reception function of the GPS unit 201 and the transmission function of the camera unit 251. This can reduce useless wireless communications when position information need not be transmitted from the GPS unit 201 to the camera unit 251.

Figure 5:
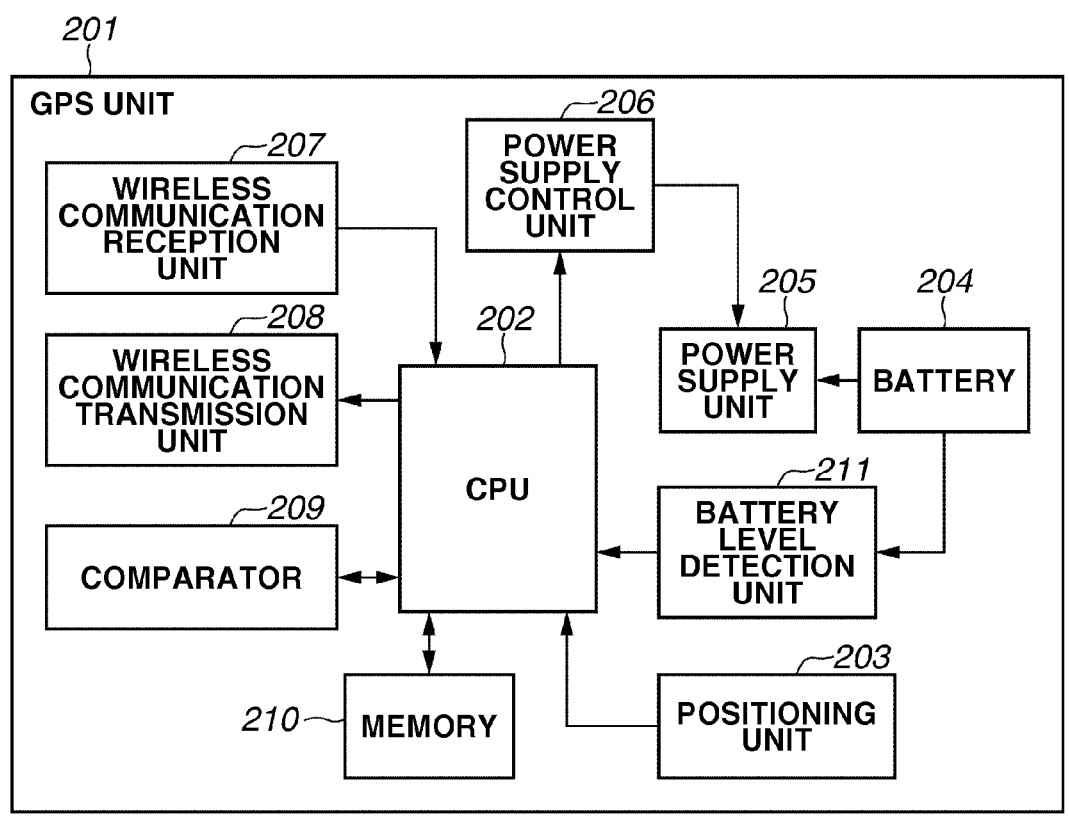
FIG. 5 is a block diagram illustrating a schematic configuration of the GPS unit according to a second exemplary embodiment.

A second exemplary embodiment will be described. FIG. 5 is a block diagram illustrating a GPS unit 201 which is the position information acquisition apparatus according to the second exemplary embodiment. The same components as those of the GPS unit 201 according to the first exemplary embodiment illustrated in FIG. 1 will be designated by the same reference numerals, and description thereof will be omitted here. A difference from the first exemplary embodiment lies in the provision of a battery level detection unit 211.

The second exemplary embodiment is an example of preventing the camera unit 251 from making a useless position information acquisition request when the GPS unit 201 runs out of battery and becomes unable to transmit position information to the camera unit 251. The battery level detection unit 211 detects the remaining battery level of the GPS unit 201. A threshold level is set to a battery level such that the addition inhibition signal can be transmitted at least once. If the detected battery level exceeds the threshold level, the GPS unit 201 transmits the addition inhibition signal to the camera unit 251.

Suppose that the GPS unit 201 subsequently runs out of battery and becomes unable to acquire position information. Even in such a case, according to the flowchart of FIG. 2, the camera unit 251 determines in step S152 that position information cannot be added. This can reduce inquiries to the GPS unit 201 that is low in battery level.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-195825 filed Sep. 1, 2010, which is hereby incorporated by reference herein in its entirety.

What is claimed is:

1. A position information acquisition apparatus capable of wireless communication with an imaging apparatus, the position information acquisition apparatus comprising:
    a position information acquisition unit configured to acquire position information that indicates a position of the position information acquisition apparatus;
    a reception unit configured to receive a request for the position information from the imaging apparatus;
    a position information transmission unit configured to transmit, to the imaging apparatus by the wireless communication, the position information acquired by the position information acquisition unit in response to a request for position information from the imaging apparatus;
    a determination unit configured to determine whether position information can be acquired by the position information acquisition unit; and
    a signal transmission unit configured to transmit a first signal to the imaging apparatus by the wireless communication if the determination unit determines that position information cannot be acquired, the first signal inhibiting the request for the position information.

2. The position information acquisition apparatus according to claim 1, wherein the signal transmission unit is configured to transmit a second signal to the imaging apparatus if the determination unit determines that position information can be acquired, the second signal permitting the request for position information.

3. The position information acquisition apparatus according to claim 1, wherein the position information acquisition unit is configured to acquire position information based on data received from a satellite.

4. The position information acquisition apparatus according to claim 1, further comprising a power control unit configured to stop or reduce power supply to a device intended for the wireless communication after the signal transmission unit has transmitted the first signal that inhibits the request for the position information.

5. The position information acquisition apparatus according to claim 1, further comprising a detection unit configured to detect a battery level of the position information acquisition apparatus,
    wherein if the battery level is lower than a predetermined level, the determination unit is configured to determine that the position information cannot be acquired.

6. A position information acquisition apparatus capable of wireless communication with an imaging apparatus, the position information acquisition apparatus comprising:
    a position information acquisition unit configured to acquire position information that indicates a position of the position information acquisition apparatus;
    a reception unit configured to receive a request for the position information from the imaging apparatus;
    a position information transmission unit configured to transmit, to the imaging apparatus by the wireless communication, the position information acquired by the position information acquisition unit in response to a request for position information from the imaging apparatus;
    a determination unit configured to refer to values of a plurality of pieces of position information acquired by the position information acquisition unit, and determine whether the position of the position information acquisition apparatus is changed; and
    a signal transmission unit configured to transmit a first signal to the imaging apparatus by the wireless communication if the determination unit determines that the position of the position information acquisition apparatus is not changed, the first signal inhibiting the request for the position information.

7. The position information acquisition apparatus according to claim 6, wherein the signal transmission unit is configured to transmit a second signal to the imaging apparatus if the determination unit determines that the position of the position information acquisition apparatus is changed, the second signal permitting the request for position information.

8. The position information acquisition apparatus according to claim 6, wherein the position information acquisition unit acquires position information based on data received from a satellite.

9. The position information acquisition apparatus according to claim 6, further comprising a power control unit configured to stop or reduce power supply to a device intended for the wireless communication after the signal transmission unit has transmitted the first signal that inhibits the request for the position information.

10. The position information acquisition apparatus according to claim 6, further comprising a detection unit configured to detect a battery level of the position information acquisition apparatus,
    wherein if the battery level is lower than a predetermined level, the determination unit is configured to determine that the position information cannot be acquired.

11. A method of controlling a position information acquisition apparatus capable of wireless communication with an imaging apparatus, the method comprising:
  acquiring position information that indicates a position of the position information acquisition apparatus;
  receiving a request for the position information from the imaging apparatus;
  transmitting the acquired position information by the wireless communication in response to a request for position information from the imaging apparatus;
  determining whether the position information can be acquired; and
  transmitting a first signal to the imaging apparatus by the wireless communication if it is determined that the position information cannot be acquired, the first signal inhibiting the request for the position information.

12. A method of controlling a position information acquisition apparatus capable of wireless communication with an imaging apparatus, the method comprising:
  acquiring position information that indicates a position of the position information acquisition apparatus;
  receiving a request for the position information from the imaging apparatus;
  transmitting the acquired position information by the wireless communication in response to a request for position information from the imaging apparatus;
  referring to values of a plurality of pieces of position information acquired, and determining whether the position of the position information acquisition apparatus is changed; and
  transmitting a first signal to the imaging apparatus by the wireless communication if it is determined that the position of the position information acquisition apparatus is not changed, the first signal inhibiting the request for the position information.

13. A storage medium having stored thereon a program which, when run on a processing apparatus, causes the processing apparatus to perform the method of claim 11.

14. A storage medium having stored thereon a program which, when run on a processing apparatus, causes the processing apparatus to perform the method of claim 12.

* * * * *